United States Patent [19]

Durrer et al.

[11] 4,284,326
[45] Aug. 18, 1981

[54] APPARATUS FOR ELIMINATING EXTERNAL WEATHER EFFECTS FROM THE OBJECTIVE LENS SYSTEM OF AN AIMING PERISCOPE INSTALLED AT AN ARMED VEHICLE

[75] Inventors: Jörg Durrer, Oberengstringen; Cornelius Mayer, Fällanden, both of Switzerland

[73] Assignee: Werkzeugmaschinenfabrik Oerlikon-Bührle AG, Zürich, Switzerland

[21] Appl. No.: 130,035

[22] Filed: Mar. 13, 1980

[30] Foreign Application Priority Data

Mar. 29, 1979 [CH] Switzerland .................... 2900/79

[51] Int. Cl.³ .................. G02B 23/08; G02B 23/16
[52] U.S. Cl. ........................................ 350/63; 350/52
[58] Field of Search ...................... 350/63, 60, 52

[56] References Cited

U.S. PATENT DOCUMENTS

| 759,622 | 5/1904 | Lake | 350/63 |
|---|---|---|---|
| 1,222,156 | 4/1917 | Steinmetz | 350/63 |
| 2,534,884 | 12/1950 | Strang | 350/63 |

FOREIGN PATENT DOCUMENTS 1186939 9/1959 France ........................ 350/63

Primary Examiner—Jon W. Henry
Attorney, Agent, or Firm—Werner W. Kleeman

[57] ABSTRACT

In order to eliminate or suppress external weather effects from acting upon the objective lens system or arrangement of an aiming periscope installed at an armed combat vehicle, a part which protrudes out of the combat compartment or space of the vehicle is surrounded by a protective globe or hood. Between the protective globe or hood and the protruding part there are provided air channels, by means of which there can be conveyed an air current past the objective lens system towards the outside. Advantageously, the excess pressure emanating from the combat compartment is employed for generating the air current or flow. Apart from the weather protection which is thus provided for the objective lens system there also is afforded a temperature compensation within the aiming periscope.

5 Claims, 2 Drawing Figures

APPARATUS FOR ELIMINATING EXTERNAL WEATHER EFFECTS FROM THE OBJECTIVE LENS SYSTEM OF AN AIMING PERISCOPE INSTALLED AT AN ARMED VEHICLE

BACKGROUND OF THE INVENTION

The present invention relates to a new and improved construction of apparatus for eliminating or repelling the external weather effects at the outlook portion, more commonly usually referred to herein as the objective lens system or objective lens portion, of an aiming periscope installed at an armed vehicle, the aiming periscope having a portion or part containing the objective lens system or portion which protrudes out of a combat compartment or area of the combat vehicle.

According to a heretofore employed proposal, the glass disc or pane, which forms the outlook or objective lens system of the aiming periscope is mounted upon a heating plate, whereby there is effectuated from within drying of the objective lens system which is exposed to weather effects. Disadvantageous with this state-of-the-art solution is the relatively long startup time needed until there can be realized the desired effect, and equally, the requisite additional electrical connections. Furthermore, the part of the aiming periscope which protrudes out of the combat compartment is exposed to a large temperature differential in relation to the part located in the uppermost portion of the combat compartment of the combat vehicle.

SUMMARY OF THE INVENTION

Therefore, with the foregoing in mind, it is a primary object of the present invention to provide a new and improved construction of apparatus for repelling external weather effects from the outlook or objective lens system of an aiming periscope installed into an armed vehicle in a manner not afflicted with the aforementioned drawbacks and limitations of the prior art.

Another and more specific object of the present invention aims at providing a weather protection apparatus for eliminating external weather effects at the objective lens system or portion of an aiming periscope of a combat vehicle, which affords effective protection for the part of the aiming periscope which is exposed to the weather effects.

Yet a further significant object of the present invention aims at providing an apparatus for eliminating external weather effects at the portion of an aiming periscope of a combat vehicle, as such term is used in its broadest sense to cover the most various types of combat equipment, and which apparatus is relatively simple in construction and design, economical to manufacture, extremely reliable in operation, not readily subject to breakdown or malfunction and requires a minimum of maintenance and servicing.

Now in order to implement these and still further objects of the invention, which will become more readily apparent as the description proceeds, the apparatus for eliminating or repelling external weather effects at the objective lens system or portion of an aiming periscope mounted in an armed vehicle, wherein the aiming periscope has a protruding part, containing the objective lens system, which protrudes out of a combat compartment or area of the vehicle, is manifested by the features that the protruding part is surrounded by a protective globe or hood, and between the protective globe or hood and the protruding part there are provided air channels by means of which there can be conveyed an air current past the objective lens system towards the outside.

Significant advantages of the invention, particularly worthy of mention are the fact that there can be realized a rapid and positive repelling of droplets, flocks, and also dust and so forth, and there can be effectively avoided the fogging of the outlook or outviewing glass. Additionally, due to the air flow or current there is accomplished a temperature equalization between the part of the aiming periscope located within the combat compartment and the part of the aiming periscope protruding out of the combat compartment. If the excess pressure within the combat compartment or area is used for producing the air flow or current, then additionally there is realized a beneficial venting of the uppermost region of the combat compartment, in which, as is known, the gunner or crew member often is exposed to uncomfortable conditions. The aiming periscope is mounted in conventional manner in the wall of the combat vehicle, so that it can be easily pivoted about the vertical axis so that it is brought into a vertical or normal position. Up to the present, it was conventional practice to install between the pivotable part and the wall a rubber bellows serving as a seal, which likewise was exposed, without any protection, to the external weather effects. With the inventive solution, also these effects can be advantageously eliminated and concomitant therewith, there can be obtained an improved sealing action.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
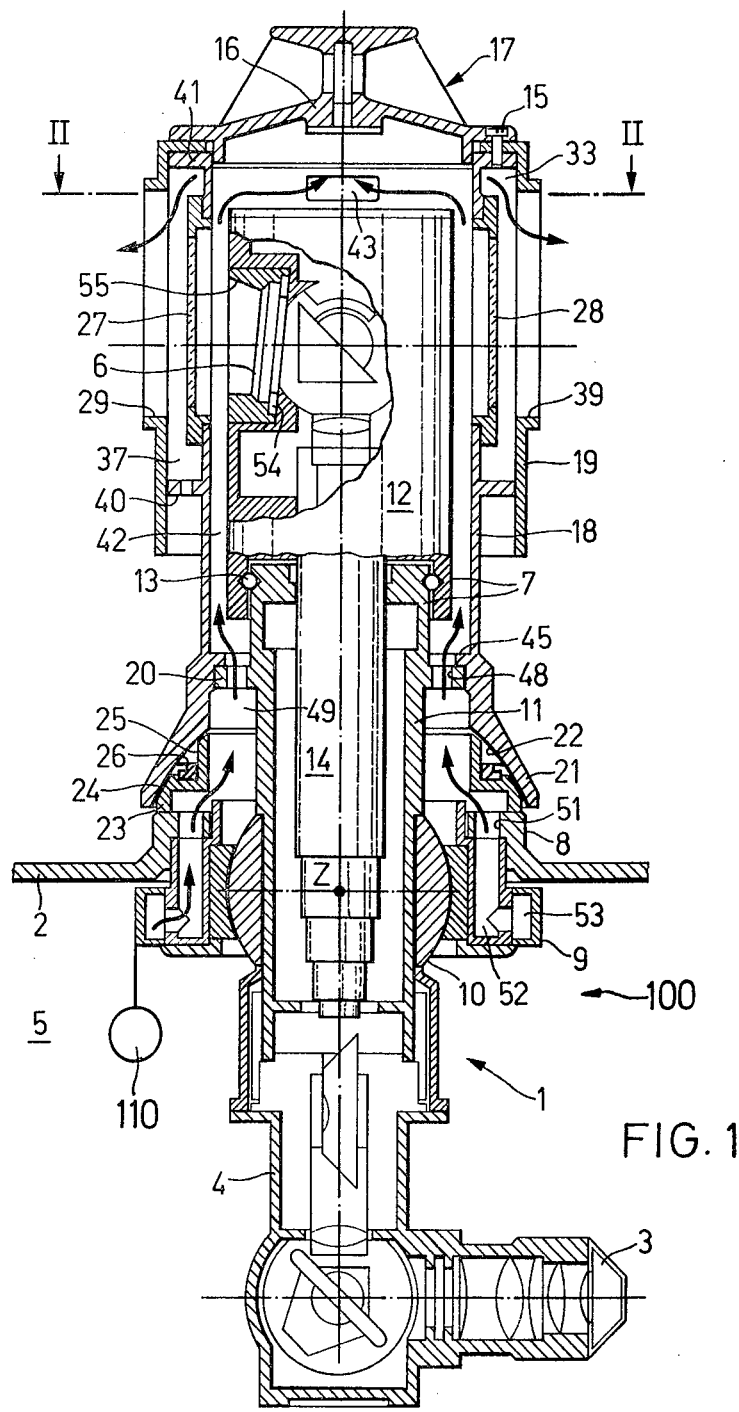
FIG. 1 is a vertical sectional view of an aiming periscope and its protective globe or hood member and constructed according to the invention.

Describing now the drawings, according to the exemplary embodiment shown in FIG. 1, an aiming or sighting periscope 1 is mounted in an upper wall 2 of an armed combat vehicle, generally merely schematically represented by reference character 100, such that a portion or part 4 of the aiming periscope 1 which is provided with an eyepiece portion 3, is located within a combat compartment or area 5 of the combat vehicle 100. On the other hand, a further portion or part 7 of the aiming periscope 1 which is provided with the outlook or objective lens system or portion 6, protrudes out of such combat compartment 5. The wall 2 of the combat vehicle 100 has a projection or extension 8 in which there is secured a bearing element or body 9 at the side of the combat compartment 5. In the bearing element or body 9 there is mounted, by means of a substantially spherical-shaped bearing surface 10, an essentially sleeve-shaped body member 11 of the aiming periscope 1 in such a manner that it is possible to pivot the vertical axis of the aiming periscope 1 throughout the region of a virtual conical jacket, whose cone apex is located at the center Z of the the spherical-shaped bearing surface 10 and whose aperture angle amounts to about 10°.

Rotatably mounted upon the sleeve-shaped body member or body 11 is a head member 12 of the aiming periscope 1 by means of a bearing 13 or equivalent structure. The rotational drive of the head member 12 is controlled from the interior of the combat compartment 5 in any suitable and well known manner, through the use of a standard drive which has not been shown since it forms no part of the invention and is unnecessary for understanding the underlying principles and concepts of this development. A part 14 of the aiming periscope 1 which encompasses or contains the conventional optical system is connected to be non-rotatable with and in relation to the head member 12 and is rotatably arranged in the sleeve-shaped body member.

The part or portion 7 of the aiming periscope 1, protruding out of the combat compartment or area 5, is surrounded by a bell-like or otherwise suitably configured protective hood or globe member 17. The protective hood or globe member 17 contains an inner portion or part 18 and an outer jacket or portion 19, which are interconnected with one another and with a globe or hood head portion 16 by means of threaded bolts or screws 15 or other suitable fastening expedients. By means of a flange 45 of the inner portion 18 of the protective hood or hood member 17 the latter is mounted upon a coacting flange 20 of the non-rotatable body of body member 11. At its lower end, the inner portion or part 18 of the protective hood or globe 17 contains a widened or diverging portion 21 which is provided with a substantially spherical-shaped inner bearing surface 22. At the projection or extension 8 of the vehicle wall 2 there is secured a ring body 23 which is equipped with a substantially spherical-shaped outer bearing surface 24. Both of the spherical-shaped bearing surfaces 22 and 24 are located opposite one another, and the center of both surfaces 22 and 24 coincides with the center Z of the bearing surface 10. In one of both bearing surfaces 22 and 24, if necessary in the bearing surface 24 operatively associated with the ring body or ring-shaped portion 23, there is formed a circumferential or peripheral groove 25 in which there is mounted a sealing ring 26.

Arranged in the internal portion or part 18 of the protective hood or hood member 17 are two diametrically oppositely situated protective windows 27 and 28, wherein the one window 27 is oriented in the firing direction of the vehicle 100. The outer jacket or shell 19 is provided with two outlet openings 29 and 39 operatively associated with the protective windows 27 and 28 respectively. In FIG. 1 there is illustrated that position of the head member 12 where the objective lens system or portion 6 is directed in the firing direction, and thus, faces the protective window 27 and the outlet opening 29. The head member 12 together with the objective lens system 6 can also be pivoted, by means of the previously mentioned rotatable drive, in an opposite direction, in which case the objective lens system or outlook 6 faces towards the rear for rear viewing.

Figure 2:
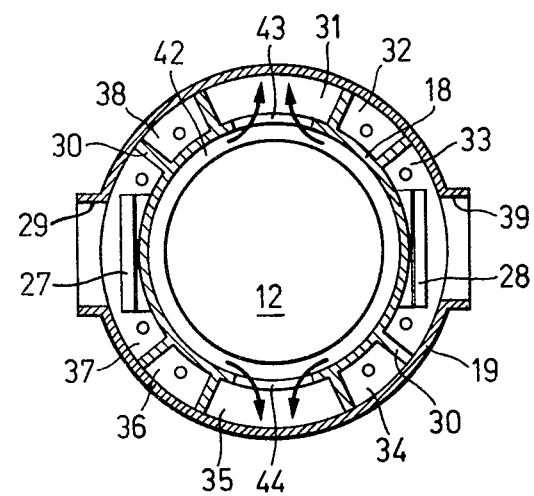
FIG. 2 is a cross-sectional view of the arrangement of FIG. 1, taken substantially along the line II—II thereof.

The internal part or portion 18, as best seen by referring to FIG. 2, may be provided with ribs 30 which sealingly contact the internal periphery of the jacket or shell 19 of the protective hood 17. The internal part or portion 18 together with the ribs 30 or equivalent structure and the jacket 19 form labyrinth channels 31 to 38, which have been conveniently numbered in the clockwise direction in FIG. 2. These labyrinth channels 31 to 38 are bounded in axial direction, on the one hand by a lower flange member 40 and an upper flange member 41 at the inner part 18, as best seen by referring to FIG. 1.

A chamber or compartment 42 provided between the head member 12 of the aiming periscope 1 and the inner part 18 of the protective hood or globe 17, as seen by referring to FIGS. 1 and 2, is connected by means of two inlet openings 43 and 44 with the labyrinth channels 31 and 35, respectively. These inlet openings or ports 43 and 44 are arranged at the upper region of the part 18 so as to be situated opposite one another and offset through 90° in relation to the protective windows 27 and 28 or the like. The labyrinth channel 31 flow communicates, on the one hand, by means of the channel 32 with the channel 33 and on the other hand, by means of the channel 38 with the channel 37. Equally, a flow communication or connection of the channel 35 is established, on the one hand, by means of the channel 34 with the channel 33 and, on the other hand, by means of the channel 36 with the channel 37. The labyrinth channels 33 and 37 open by means of the outlet openings 39 and 29 into the atmosphere or surroundings.

Towards the bottom, the compartment 42 is connected by means of bores or openings 48 provided in the flange or flange member of the body 11 with a chamber or space 49 which is bounded, on the one hand, by the body or body member 11, and, on the other hand, by the inner part 18 at the protective hood 17 and by the ring body 23. This chamber or space 49 flow communicates by means of further bores 51 provided at the projection or extension 8 of the wall 2 and by means of channels 52 and 53, formed at the bearing body 9, with the combat compartment or area 5 and with a merely schematically illustrated, conventional forced ventilation source, generally indicated by reference character 110.

The optical system of the aiming or sighting periscope 1 has only been partially shown in the drawings, since the same is conventional, and therefore need not be considered here. The glass pane or disc forming at least part of the outlook or objective lens system 6 is attached to a plate 54 in the head member 12 by means of a suitable socket or mount 55.

Having now had the benefit of the foregoing description of the inventive apparatus, its mode of operation will be considered as follows:

From the combat compartment or area 5 of the armed vehicle 100 and which combat compartment is at excess pressure, for instance by the action of the schematically illustrated forced ventilation source 110, the compressed air flows, as shown in FIG. 1 by the arrows, through the channels 53, 52 provided at the bearing body 9 and through the bores 51, provided at the projection or extension 8, into the chamber 49. From this location the air current flows by means of the bores or openings 48 into the compartment 42 between the protective hood 17 and the head member 12. The compressed or pressurized air now flows upwardly past the outlook or objective lens system 6 and enters via the inlet openings 43,44 into the labyrinth channels 31 and 35 respectively, as indicated by the arrows of FIGS. 1 and 2. While within the channels 31 and 35 the pressurized air flows downwardly, the latter has imparted thereto an upward flow direction in the connected channels 32, 38, and 34, 36, until it finally again descends from above out of the channels 37 and 33 past the protective windows 27 and 28 and flows through the outlet openings 29 and 39 into the atmosphere or surroundings. During its departure out of the labyrinth channels 37, 33, the flowing pressurized air eliminates the external effects of the atmosphere, such as droplets, flocks, dust and so forth, from the protective windows 27 and 28 in a most effective manner. The outlook or objective lens system 6 is therefore, as a practical manner, protected threefold against the weather effects. Firstly, by the pressurized air which flows in the compartment 42 directly at the outlook or objective lens system 6, secondly, by the protective windows 27 and 28 themselves, and, thirdly, by the repulsion or eliminating of the weather effects at the protective windows 27 and 28 by the air flowing out of the labyrinth channels 31 to 38 which, so-to-speak, form a hot air curtain at the protective windows 27 and 28.

Due to the pivotal mounting of the sleeve-shaped body or body member 11 in the wall 2 and in the bearing body 9 which is secured at the wall 2, there is realized an accomodation to any irregularities in the encountered terrain. The vertical axis of the aiming periscope 1 can be rocked at the region of the aforementioned virtual cone jacket, and thus, always brought into the vertical or normal position. The necessary sealing between the pivotable aiming periscope 1 and the wall 2 is now advantageously realized by means of the sealing ring 26 which is arranged between the inner bearing surface 22 of the co-rocked protective hood 17 and the outer bearing surface 24 of the wall fixed-ring member or ring body 23. The sealing ring 26 is protected from the external effects of the surroundings or ambient atmosphere. The moisture which possibly penetrates into the gap or space between both of the bearing surfaces 22 and 24 is forced towards the outside, out of the chamber 49, by the action of the air pressure.

While the part 4 of the aiming periscope 1 which is provided with the eyepiece portion or eyepiece 3 is exposed to the temperature of the combat compartment or area 5, it must be expected that externally of the combat compartment 5 there will be encountered temperature fluctuations of −40° centigrade to +80° centigrade. Due to the arrangement of the protective hood or globe 17 and by virtue of the air flow, there is at least partially compensated the temperature differences between the part 4 and the part 7 of the aiming periscope 1 which protrudes out of the combat compartment 5. If the excess pressure within the combat compartment 5 is used for generating the air flow, then additionally there is beneficially realized an advantageous venting, especially of the uppermost part of the combat compartment 5, within which there is located the gunner and frequently affords extremely poor conditions for such gunner.

The illustrated exemplary embodiment shows, purely by way of illustration and example and not limitation, eight labyrinth channels 31 to 38 between the inner part 18 and the outer jacket or shell 19 of the protective hood or globe 17. The ribs 30, separating the labyrinth channels 31 to 38 from one another, and the flanges 40 and 41 are mounted at the inner part or portion 18. Of course, these components could be however equally arranged at the outer jacket or shell 19. This modification which is simply a reversal of the parts, alters nothing in terms of the underlying principles of the invention, and equally, there could be easily selected a different number or even shape of such channels. Also, the number of protective windows or the outlet openings is equally not important or crucial to the invention.

The apparatus of the invention can find particularly useful fields of application during the mounting of an aiming periscope at the most different armoured vehicle weapon systems, for instance cannons, rocket launchers, howitzers, mortars, and so forth.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for repelling external weather effects from an objective lens system of an aiming periscope mounted in an armed combat vehicle having a combat compartment, comprising:
   an aiming periscope having a part protruding out of the combat compartment of the combat vehicle;
   a protective hood surrounding said protruding part of said aiming periscope;
   means providing air channels between said protective hood and said protruding part through which there can be conveyed an air current which flows past the objective lens system of the aiming periscope towards the outside;
   means for generating an excess pressure in the combat compartment; and
   said air channels being flow connected with the combat compartment which is at excess pressure.

2. An apparatus for repelling external weather effects from an objective lens system of an aiming periscope mounted in an armed combat vehicle having a combat compartment, comprising:
   an aiming periscope having a part protruding out of the combat compartment of the combat vehicle;
   a protective hood surrounding said protruding part of said aiming periscope;
   means providing air channels between said protective hood and said protruding part through which there can be conveyed an air current which flows past the objective lens system of the aiming periscope towards the outside;
   said combat vehicle having a wall;
   substantially spherical-shaped bearing surface means for pivotably mounting said protruding part of said aiming periscope in said wall of said combat vehicle;
   a sealing element arranged between said wall and said pivotable protruding part;
   means for connecting the protective hood with said protruding part;
   said spherical-shaped bearing surface means comprising a substantially spherical-shaped inner bearing surface provided for said protective hood;
   said spherical-shaped bearing surface means further comprising a substantially spherical-shaped external bearing surface operatively associated with said wall of the combat vehicle;
   said inner bearing surface being dispositioned opposite and in coacting relationship with said outer bearing surface;
   one of said bearing surfaces having a circumferential groove: and
   said sealing element comprising a sealing ring member arranged in said circumferential groove between both of said bearing surfaces and being loaded by the pressure of the air current.

3. An apparatus for repelling external weather effects from an objective lens system of an aiming periscope mounted in an armed combat vehicle having a combat compartment, comprising:
- an aiming periscope having a part protruding out of the combat compartment of the combat vehicle;
- a protective hood surrounding said protruding part of said aiming periscope;
- means providing air channels between said protective hood and said protruding part through which there can be conveyed an air current which flows past the objective lens system of the aiming periscope towards the outside;
- said protective hood containing an inner part and an outer jacket forming at least part of said means providing the air channels;
- said inner part being provided with at least one protective window operatively associated with said objective lens system;
- said outer jacket being provided with at least one outlet opening situated opposite said protective window;
- said air channels comprising a first group of air channels and a second group of air channels;
- said first group of air channels being arranged between the inner part of the protective hood and said protruding part of said aiming periscope; and
- said second group of air channels being formed between the inner part of the protective hood and said outer jacket.

4. The apparatus as defined in claim 3, wherein:
- said second group of air channels are structured as labyrinth channels;
- said inner part of said protective hood being provided with means defining inlet opening means at the upper region of said inner part for flow communicating the labyrinth channels constituted by said second group of air channels with said first group of air channels;
- said protective hood having outlet opening means; and
- said air current, during departure from said second group of air channels moving past said protective window and being deflected through said outlet opening means.

5. An apparatus for repelling external weather effects from an objective lens system of an aiming periscope mounted in an armed combat vehicle having a combat compartment, comprising:
- an aiming periscope having a part protruding out of the combat compartment of the combat vehicle;
- a protective hood surrounding said protruding part of said aiming periscope;
- means providing air channels between said protective hood and said protruding part through which there can be conveyed an air current which flows past the objective lens system of the aiming periscope towards the outside;
- said protective hood containing an inner part and an outer jacket forming at least part of said means providing the air channels;
- said inner part being provided with at least one protective window operatively associated with said objective lens system;
- said outer jacket being provided with at least one outlet opening situated opposite said protective window;
- said protruding part of said aiming periscope contains a head member provided with said objective lens system and pivotable from a firing position into an opposite position through an angle of approximately 180°;
- a non-rotatable body member provided for the protruding part of said aiming periscope;
- said protective hood being mounted upon said non-rotatable body member;
- said inner part of said protective hood containing two protective windows which are operatively associated with respective ones of said two positions of said head member; and
- said outer jacket being provided with two outlet openings situated respectively opposite said two protective windows.

* * * * *